US006622890B2

(12) United States Patent
Gueret

(10) Patent No.: US 6,622,890 B2
(45) Date of Patent: Sep. 23, 2003

(54) DISPENSING HEAD, ASSEMBLY INCLUDING A DISPENSING HEAD, AND METHOD OF USE

(75) Inventor: Jean-Louis H. Gueret, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/887,370

(22) Filed: Jun. 25, 2001

(65) Prior Publication Data

US 2002/0020715 A1 Feb. 21, 2002

(30) Foreign Application Priority Data

Jun. 23, 2000 (FR) ........................................ 2000 08083

(51) Int. Cl.[7] ................................................ G01F 11/00

(52) U.S. Cl. ........................ 222/1; 222/136; 222/145.5; 222/321.7

(58) Field of Search ............................ 222/1, 95, 136, 222/145.4–145.6, 321.7, 321.9, 380

(56) References Cited

U.S. PATENT DOCUMENTS 3,311,263 A 3/1967 Harmon ......................... 222/1
3,593,894 A 7/1971 Kehoe et al. ............... 222/146
4,014,463 A * 3/1977 Hermann .................... 222/135
5,009,342 A * 4/1991 Lawrence et al. .......... 222/136
5,249,712 A 10/1993 Lontrade et al. ............ 222/189
5,542,580 A * 8/1996 Hatakeyama et al. ....... 222/183
5,906,316 A 5/1999 Gatzemeyer et al. ......... 239/10
6,082,588 A * 7/2000 Markey et al. ............. 222/135
6,209,757 B1 * 4/2001 Dumont .................. 222/145.5

FOREIGN PATENT DOCUMENTS

CH 310 456 10/1955
FR 2 615 826 12/1988
FR 2 669 243 5/1992
FR 2 710 612 4/1995
FR 2 783 694 3/2000
GB 2 204 253 11/1988

OTHER PUBLICATIONS

English language Derwent Abstract of FR 2 615 826, Dec. 2, 1988.
English language Derwent Abstract of FR 2 669 243, May 22, 1992.
English language Derwent Abstract of FR 2 710 612, Apr. 7, 1995.
English language Derwent Abstract of FR 2 783 694, Mar. 31, 200.

* cited by examiner

*Primary Examiner*—Joseph A. Kaufman
(74) *Attorney, Agent, or Firm*—Finnegan, Henderson, Farabow, Garrett & Dunner, LLP

(57) ABSTRACT

A dispensing head on a reservoir containing a first product, such as a cosmetic or care product, comprises a passage opening into at least one product outlet orifice. The passage extends through a cavity upstream of the outlet orifice. A second product in solid or semi-solid form may be disposed in the cavity so as to be in contact with the first product when the first product is dispensed from the reservoir. The cavity may have an opening accessible, from outside the head, via at least one moveable element articulably coupled to a body of the dispensing head.

133 Claims, 6 Drawing Sheets

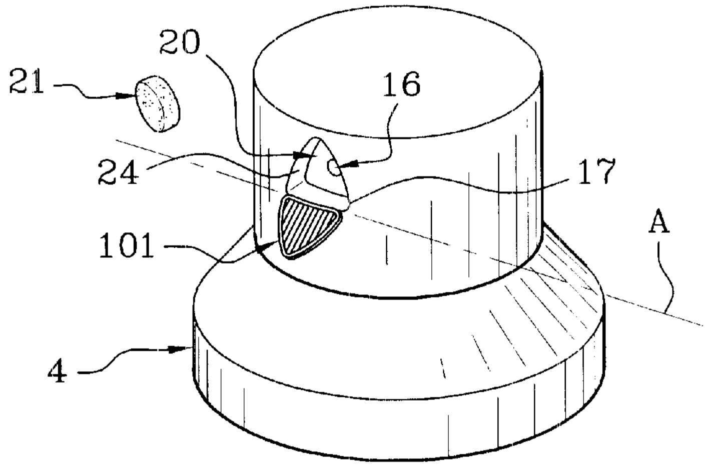
Fig. 8
Fig. 9
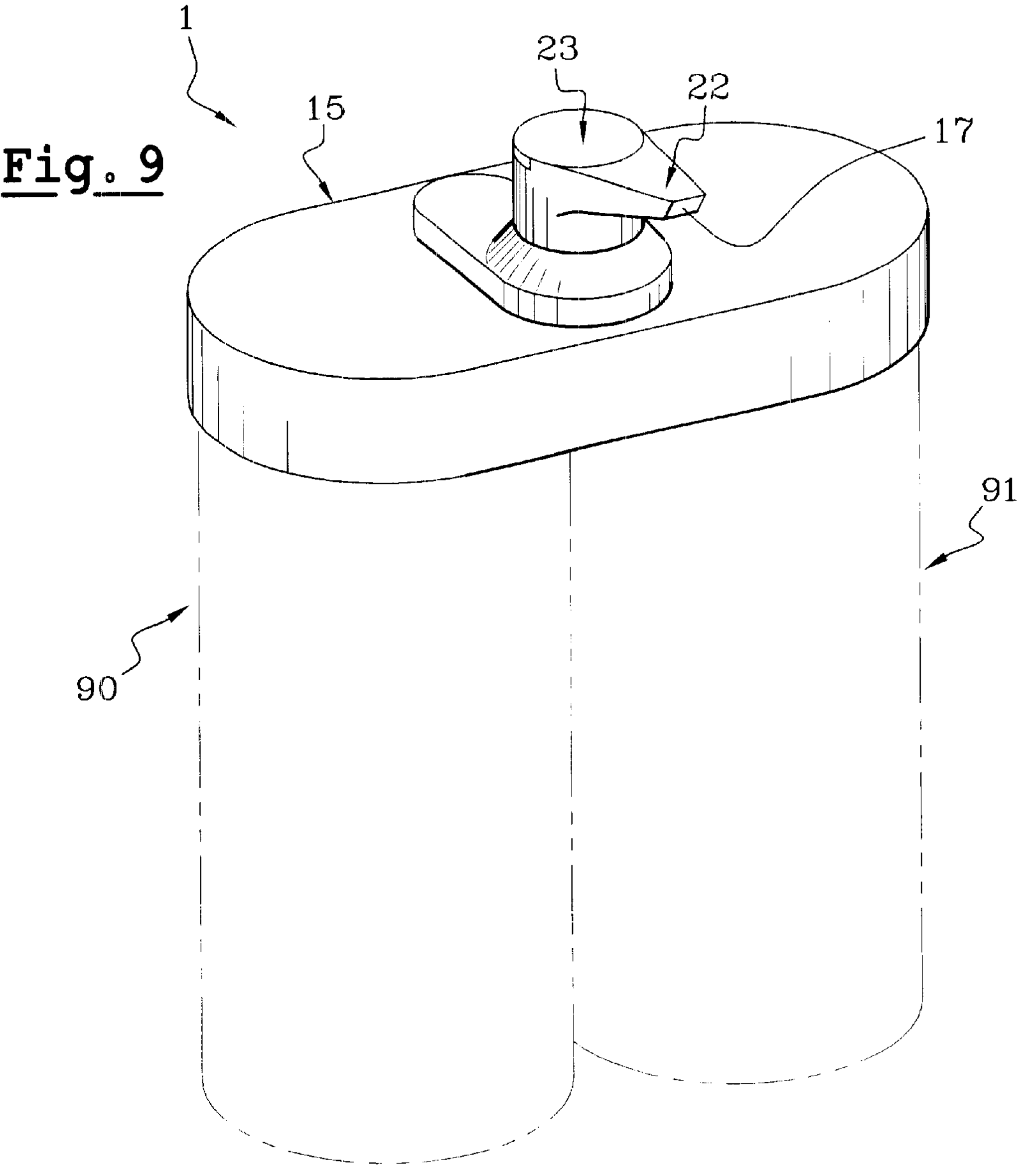

DISPENSING HEAD, ASSEMBLY INCLUDING A DISPENSING HEAD, AND METHOD OF USE

FIELD OF THE INVENTION

The present invention relates to a dispensing head, a dispensing assembly equipped with a dispensing head, and a method for using the dispensing head to dispense a first and a second product.

BACKGROUND

In the field of cosmetics, such as skin care or makeup, for example, it is common practice for various combinations to be produced from a base composition, such as a make-up composition or moisturizing composition, for example, in an aqueous phase with active ingredients such as vitamin C, vitamin A or any other active ingredient used for its cosmetic or other similar dermo-pharmacological benefits.

Certain combinations of such compositions do not pose problems insofar as the active ingredient to be combined with the composition is relatively stable, when incorporated into the composition. Problems may arise, however, with certain combinations when the active ingredient degrades relatively quickly over time, particularly upon contact with water or any other solvent that may be contained in the base composition.

Furthermore, there may be a need for a type of care, sometimes referred to as "bespoke care," whereby the user herself, according to her circumstances, her environment, or quite simply according to the needs of her skin, chooses the active ingredient or ingredients she wishes to combine with the base composition.

Examples of conventional dispensing devices can be found in U.S. Pat. Nos. 5,249,712 and 3,593,894. In these devices, accessibility to the portion of the dispensing head containing the second product with which the first product is intended to be brought into contact is via a removeable element that is either screwed or snap-fastened onto the dispensing head. As a result of this configuration, the removeable element may become lost en route. Furthermore, the outlet of the dispensing head is formed in the removeable element. Upon opening this removeable element, it may be necessary for the fingers to come into contact with a portion of the dispensing head that has been soiled with product, or with the mixture of the first and the second products.

SUMMARY

An optional object of the present invention is to provide a dispensing head and a dispensing assembly equipped with such a head which in a relatively simple and economical way may make it possible to combine one or more active ingredients with a base composition and bring those one or more active ingredients into contact only at the time the mixture is to be applied to the surface to be treated.

Another optional object of the invention is to provide a dispensing head, and a dispenser equipped with such a head, that allows the active ingredient that is to be associated with the base composition to be selected by the user as desired.

A further optional object of the invention is to provide a dispensing head, and a dispenser equipped with such a head, which may be relatively simple to use and may be washed, particularly each time the active ingredient is changed.

Yet other optional objects will become apparent from the detailed description which follows.

The devices and methods of dispensing described herein may optionally solve some or all of the problems discussed above with reference to conventional dispensing devices and methods. It should be understood that the invention could be practiced without performing one or more of the optional objects and/or advantages described above. Certain other optional aspects of the invention will become apparent from the detailed description which follows.

According to an optional aspect of the invention, a dispensing head comprises a passage configured to be placed in flow communication with at least one reservoir for containing a first product. The dispensing head further may comprise a cavity in flow communication with the passage. The cavity may be configured to contain a second product. An outlet orifice may be in flow communication with the cavity, the outlet orifice being configured to dispense the first product and the second product together. The dispensing head may further comprise a moveable element configured to articulate between an open position providing access to the cavity from outside the dispensing head and a closed position closing off access to the cavity from outside the dispensing head.

Yet another optional aspect of the invention includes a dispensing head comprising a body defining a passage, a cavity, and a dispensing outlet. The dispensing head may further comprise a moveable element configured to move with respect to the body from an open position providing access to the cavity from outside the dispensing head to a closed position closing off access to the cavity from outside the dispensing head. The passage may be configured to be in flow communication with at least one reservoir for containing a first product, and the cavity may be configured to contain a second product to be dispensed together with the first product through the outlet.

Yet another optional aspect of the invention includes a dispensing assembly comprising at least one reservoir for containing a first product and an airless pump associated with the at least one reservoir for flowing the first product from the at least one reservoir. The dispensing assembly may further comprise a dispensing head for actuating the airless pump. The dispensing head may comprise a cavity configured to contain a second product, and an outlet in flow communication with the cavity. The outlet may be configured to dispense the first product and the second product upon actuation of the airless pump.

As used herein, the term "airless pump" refers to a pump that provides pumping of a substance from a reservoir in essentially a single direction without permitting reverse (intake) flow of air via the pump. That is, as product is pumped from the reservoir, the pumped product is not replaced with a corresponding volume of air, or other substance through the pump, thus ensuring that no air will be taken into the reservoir after a dose of product has been dispensed.

According to another optional aspect of the invention, the moveable element may, apart from providing access to the cavity (particularly with a view to introducing the second product) fulfill other roles. For example, it may act as a valve equipping the outlet orifice of the dispensing head. It may also define at least part of the cavity for containing the second product. Alternatively, the moveable element may delimit all or part of the passage situated downstream of the cavity. Finally, at least a portion of the moveable element may immobilize the second product within the cavity.

The dispensing head optionally may be made of a single piece obtained by molding. The cost may be low and its operation, particularly the insertion of a fresh amount of second product, may be relatively easy and may be done without the risk of overly dirtying the fingers.

The user optionally may selectively choose which active ingredient, i.e., second product, she wishes to combine with the base composition. She may change it each time she wishes, either after having completely used up the particular second product in the cavity or during the course of the use of a particular second product. Each time the user changes the second product in the cavity, the user may rinse the dispensing head under the tap so as to rid the cavity and the surrounding passages of any solid residue which may remain therein. This may avoid blocking the passages in the dispensing head and/or contaminating one active ingredient in a second product with another active ingredient in another second product.

As an option, the moveable element may move with respect to the product outlet of the dispensing head. The moveable element also may move with respect to at least a portion of the passage. The passage may be situated downstream of the cavity (with respect to the direction in which the product flows during dispensing, i.e., the dispensing flow direction). These characteristics may distinguish the device according to optional aspects of the present invention from the conventional devices described earlier in which both the part of the passage situated downstream of the cavity and the outlet are formed in the moveable element.

As another option, the moveable element may be configured, at least in the closed position, to sealingly cover the cavity. The closed position may be understood as meaning a position in which the moveable element may not be subjected to appreciable stress, for example stress resulting from the pressure of the product.

In the optional embodiment, the moveable element may be selectively moved between a first position in which the cavity is in communication with the outlet, and a second position in which the cavity is accessible so that a block of the second product may be introduced.

The cavity may optionally be located upstream of the outlet of the dispensing head in a dispensing flow direction. The cavity optionally may be located downstream of at least a portion of the passage in a dispensing flow direction. As an option, at least a portion of the passage may be located downstream of the cavity in a dispensing flow direction.

The moveable element may optionally be configured to articulate with respect to a portion of the passage disposed downstream of the cavity. For example, a hinge could be provided to enable the movable element to pivot about a hinge axis.

In yet another optional embodiment, the dispensing head may comprise a mixing mechanism for facilitating mixing of the first and second products together. The mixing mechanism may comprise at least one of baffles, reducers, and breakers. The mixing mechanism also optionally may be disposed between the cavity and the outlet. Such a mixing mechanism also may make it possible to hinder the block of product in solid from being carried along as in whole form toward the outlet. This last function may also be fulfilled using a member, for example, in the form of a grating or other similar perforated member arranged between the cavity and the outlet orifice so as to hold the block of second product in solid or semi-solid form inside the cavity. The perforated member optionally may be disposed between the cavity and the outlet.

As an option, the moveable element may comprise one of a lid attached to a portion of the dispensing head via an articulation and a valve configured to open in response to sufficient pressure.

The dispensing head may optionally comprise a second moveable element, wherein at least a portion of the second moveable element defines the outlet. The second moveable element may optionally be configured to articulate with respect to at least a portion of the dispensing head.

The moveable element may be configured to hold the second product and to position the second product in the cavity when the moveable element is in the closed position.

In yet another optional embodiment, the dispensing head may be configured to actuate one of a pump and a valve to dispense the first product from the reservoir. The dispensing head optionally may be in the form of a push-button actuator.

The dispensing head may further comprise the second product and the cavity may optionally contain the second product. The second product may be chosen from a solid product and a semi-solid product. The second product may optionally be in the of a compacted powder, a gel, a cream, of a gum or an element covered with a membrane capable of dissolving or bursting under the pressure of the base composition. As an option, the second product may be such that before being dissolved in the base composition, i.e., the first product, or carried along in fragments thereby, the second product may be able to reside in a localized manner inside the cavity even though a portion of the passage may pass through it. By way of another optional example, the second product may be contained, for example, in the form of a powder, within a porous support such as an open-cell or semi-open-cell foam, a woven or a nonwoven material, or a sintered material. The second product also may optionally comprise a cosmetically active ingredient.

The cavity containing the second product may be at a distance from the outlet.

The moveable element may be on a different face of the dispensing head from the face onto which the outlet opens, or it may be on the same face. In the latter instance, it may be possible for the cavity containing the second product to be immediately upstream of a valve with which the outlet may be equipped, and which opens under the pressure of the product. In this case, the valve may constitute the moveable element of the present invention. According to this optional embodiment, the product may be introduced into the cavity through the valve, for example by forcing it open using an appropriate tool or a finger. Likewise, upon use, the mixture of the first and second products may exit via the valve, which may open under a sufficient pressure.

According to another optional embodiment, the moveable element may comprise a flap hinged by means of a film hinge, or any other type of articulation mechanism. A locking means, of the clip-fastening type, for example, may be provided, so as to lock the moveable element in a closed position.

The second product optionally may be contained inside a perforated housing carried by the moveable element and configured, when the moveable element is in the closed position, to be housed in the cavity. One end of the perforated housing may be closed by a portion of the surface of the moveable element and the other end may be open so that the solid element may be positioned and closed within the cavity when the moveable element is in the closed position. Slots may extend axially between the two ends of the housing to allow the first product to come into contact with the solid product contained in the housing and/or to allow the mixture of the two products to be carried towards the outlet orifice.

The dispensing head optionally may be shaped in the form of a push-button capable of allowing the actuation of at least one dispensing element, particularly of a pump or of a valve. The at least one product outlet may be formed inside a diffusion member forming part of the dispensing head. For example, the portion forming the outlet may comprise a grating, a sintered material, a foam, a valve that is opened under the pressure of the product, or a nozzle, such as a swell-inducing nozzle. The outlet also optionally may be closed by a valve, such as, for example, an elastomeric strip capable of opening under the pressure of the product and of closing by elastic return when the pressure ceases.

According to another optional aspect of the invention, a dispensing assembly comprises at least one reservoir configured to contain a first product and a dispensing head associated with the reservoir.

The dispensing assembly may further comprise a dispensing mechanism associated with the reservoir, the dispensing head being configured to actuate the dispensing mechanism to dispense the first product from the reservoir. The dispensing mechanism optionally may be chosen from a pump and a valve.

The passage optionally may be configured to engage with a stem on one of the pump and the valve.

The at least one reservoir optionally may be defined by at least one moveable portion. The moveable portion may be chosen from a flexible wall and a piston. As another option, the at least one reservoir has a variable volume.

The volume of the at least one reservoir may decrease as the first product is dispensed from the at least one reservoir. The reservoir may optionally be in the form of a flexible pouch or a bottle. According to yet another optional embodiment, the reservoir may be in the form of a deformable-walled bottle or tube configured to force the first product to exit as a result of a raised pressure resulting from the deformation of the walls. Such deformation may be caused by squeezing, for example.

The at least one reservoir optionally may comprise two reservoirs. The dispensing assembly may further comprise two dispensing mechanisms, each dispensing mechanism being associated with one of the reservoirs to dispense the product. Also optionally, the dispensing head may be configured to actuate both dispensing mechanisms simultaneously.

Optionally, the dispensing assembly further comprises the second product and the cavity contains the second product. The second product optionally may comprise a cosmetically active ingredient. Also optionally, the dispensing assembly may comprise the first product and the reservoir may contain the first product. The dispensing assembly may optionally comprise the second product, with the cavity containing the second product, and wherein the first product may be capable of dissolving the second product.

According to yet a further optional aspect of the invention, a method for dispensing a first product and a second product comprises providing a dispensing head, wherein the at least one reservoir contains the first product. The method may further comprise providing the second product in the cavity and flowing the first product from the reservoir to the cavity. Further, the method may comprise passing the first product and the second product from the cavity and through the outlet orifice.

The method optionally may further comprise actuating one of a pump and a valve to flow the first product from the at least one reservoir. The actuating optionally may comprise moving at least a portion of the dispensing head relative to the at least one reservoir.

As an option, there may be a plurality of second products and the method may further comprise removing one of the second products that is disposed in the cavity and replacing the removed second product with another one of the second products. The plurality of second products optionally may be chosen from second products having similar characteristics and second products having differing characteristics.

According to another optional aspect, the method may further comprise articulating the moveable element to the open position to provide the second product in the cavity.

As yet another option, the method may further comprise mixing the first and second products in the cavity and the passing may comprise passing the mixture through the outlet orifice.

As an option, the method also may comprise dissolving the second product with the first product.

According to another optional embodiment, the assembly according to the invention comprises two reservoirs each containing a first product and each equipped with a dispensing mechanism, such as a pump or a valve. The dispensing head may be capable of causing the simultaneous operation of each of the dispensing mechanisms.

Optionally, the second product in solid form may contain at least one cosmetic or care active ingredient, such as vitamin C, vitamin A, or kojic acid, for example.

Aside from the structural and procedural arrangements set forth above, the invention could include a number of other arrangements, such as those explained hereinafter. It is to be understood that both the foregoing description and the following description are exemplary.

BRIEF DESCRIPTION OF THE DRAWINGS

The accompanying drawings are incorporated in and constitute a part of this specification. The drawings illustrate optional embodiments of the invention and, together with the description, serve to explain some principles of the invention. In the drawings.

FIG. 8 is a perspective view of an optional embodiment of a dispensing head according to yet another optional aspect of the invention; and FIG. 9 is a yet another optional embodiment of a perspective view of a dispensing assembly according to an optional aspect of the invention.

DESCRIPTION OF EXEMPLARY EMBODIMENTS

Figure 1:
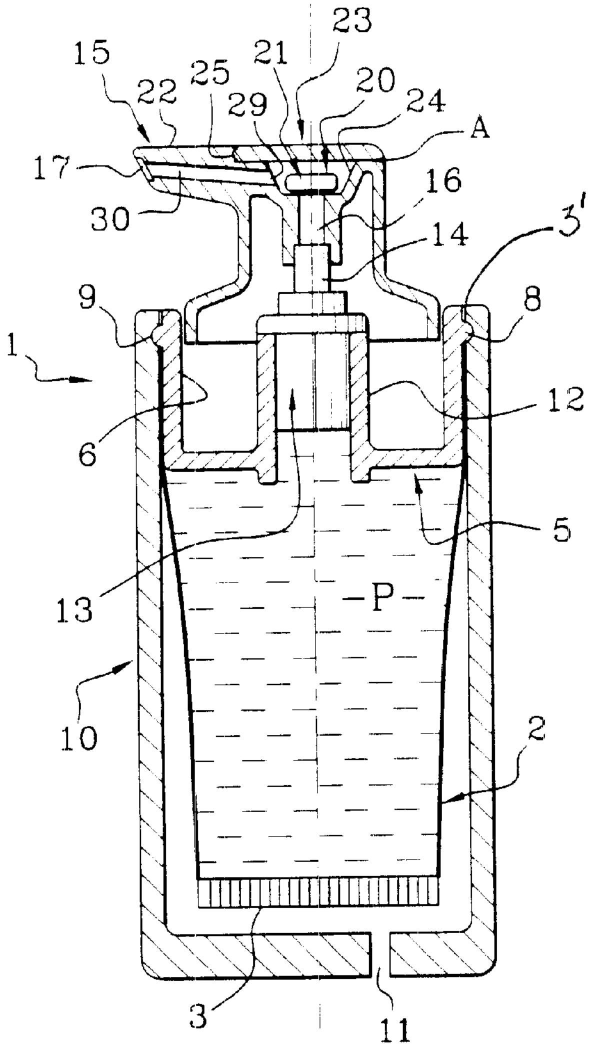
FIG. 1 is a cross-section of an optional embodiment of a dispensing assembly according to an optional aspect of the invention.

The dispensing assembly 1 depicted in FIG. 1 comprises a flexible-walled pouch 2, which may be optionally be formed of a multi-layer complex containing a layer of aluminum. The pouch 2 may have one end closed by an end wall 3 and an opposite end having a free edge delimiting an opening 3'. Mounted in a sealed manner inside the opening is an intermediate piece 5. The sealed mounting of the intermediate piece 5 on the pouch 2 may be achieved by bonding or welding together the interior surface of the free edge of the pouch 2 and the exterior surface of a lateral skirt 6 formed by the intermediate piece 5. The lateral skirt 6 may have an annular bulge 8 designed to engage, for example, by snap-fastening, with a corresponding groove 9 formed on the interior surface of a chamber 10. The chamber 10 may optionally be formed of a rigid polypropylene. The bottom end of the reservoir 10 may have an opening 11 for allowing air into the space lying between the rigid chamber 10 and the flexible-walled pouch 2. This may make it possible to compensate for a reduction in volume of the pouch as a result of dispensing a dose of product from the dispensing assembly 1.

Optionally, the pouch 2 may contain a moisturizing composition P for the body.

The intermediate piece 5 may comprise an axial hollow slot 12 in which an airless pump 13 may be mounted, such as by force-fitting, for example. The pump 13 may comprise an emerging stem 14 on which may be mounted a dispensing head 15. The dispensing head 15 may be mounted on the pump 13 via a passage portion 16 engaging with the emerging stem 14 of the pump 13. An outlet orifice 17 may be formed in the dispensing head 15. The passage portion 16 may connect the stem 14 to the cavity 20 formed in the dispensing head. A solid block of product 21, which may comprise vitamin C or another active ingredient, may be placed inside the cavity 20. On the other side of the cavity 20, another portion 30 of the passage may open into the outlet orifice 17.

Optionally, the dispensing head 15 may be formed of polypropylene. The dispensing head 15 may comprise a top surface 22 configured to activate the pump 15. The surface 22 may have a shutter 23 configured to reversibly stopper an opening 24 delimited by an edge of the cavity 20. The shutter 23 may be pivotably coupled to (i.e., configured to articulate with respect to) the body 4 of the dispensing head 15. According to this optional embodiment, the shutter 23 may be connected to the body 4 via an articulation member, such as a film hinge. The shutter may be articulable about an axis A. On the opposite side of the axis A, the shutter 23 may comprise a bulge 25 capable of allowing the shutter 23 to be locked in the closed position, for example, by clip-fastening. The dispensing head used according to this optional embodiment is depicted in perspective view in FIG. 3.

Having introduced the solid block 21 of second product into the cavity 20, the user may close the shutter 23 again. The pump 13 may be activated by pressing on the top surface 22 of the dispensing head 15, causing the product P to flow through the pump stem 14. The product P may enter into the portion 16 of the passage and then into the cavity 20 where it is brought into contact with the block of product 21. This may cause all or some of the block 21 to dissolve or to fragment. The mixture obtained may then leave through the outlet orifice 17 via the passage portion 30. A grating 29 may be arranged at the entry to the portion 30 of the passage, so as to prevent the block of product 21 from being carried along directly toward the outlet orifice 17. The block of product 21 may be dissolved or fragmented in its entirety in the course of one and the same use of the dispenser. Alternatively, one and the same block of product 21 may be used for several cycles involving the dispensing of the product P.

Figure 2:
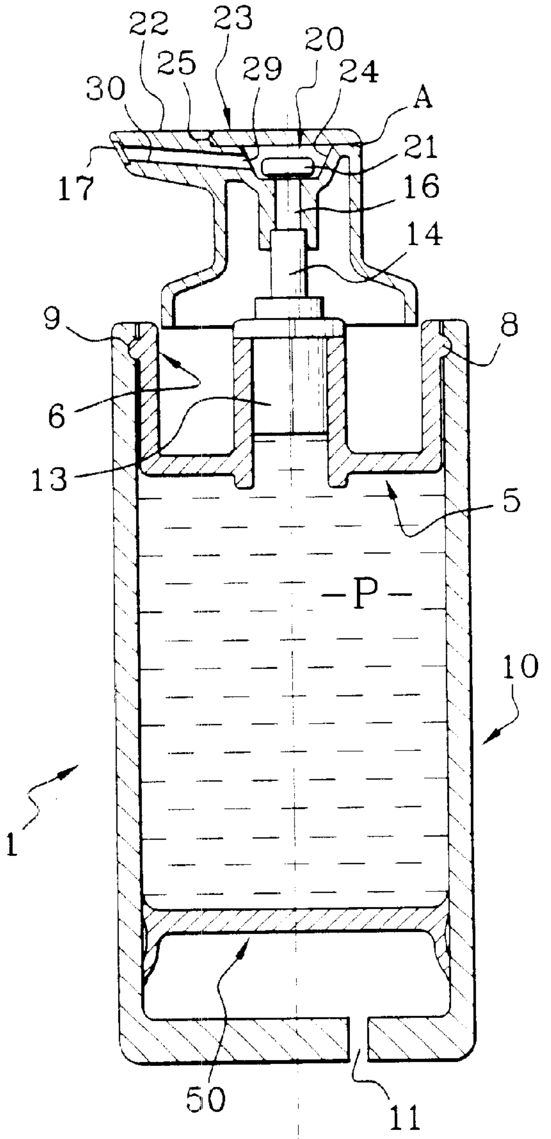
FIG. 2 is a cross-section of another optional embodiment of a dispensing assembly according to another optional aspect of the invention.

In the optional embodiment of FIG. 2, the product P is contained directly in a rigid chamber 10. Inside the chamber 10, a piston 50 may be mounted such that it is free to slide as the product P is gradually dispensed. The piston 50 may move up inside the rigid chamber 10 under the effect of a decrease in pressure in the chamber 10 resulting from a reduction in volume of product P, which reduction is not compensated for by a corresponding volume of air. The dispensing head 15 may in all other respects be substantially similar to the dispensing head described with reference to FIG. 1.

Figure 3:
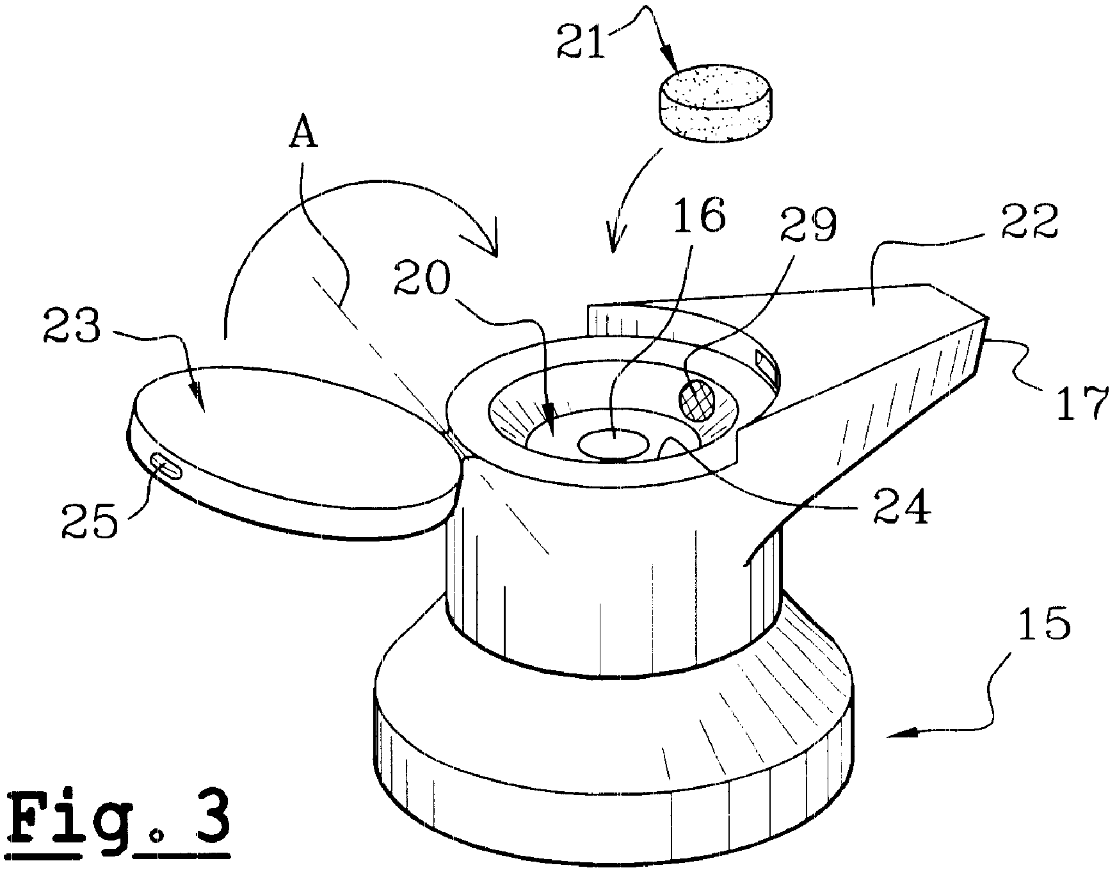
FIG. 3 is a perspective view of an optional embodiment of a dispensing head according to an optional aspect of the invention.
Figure 4:
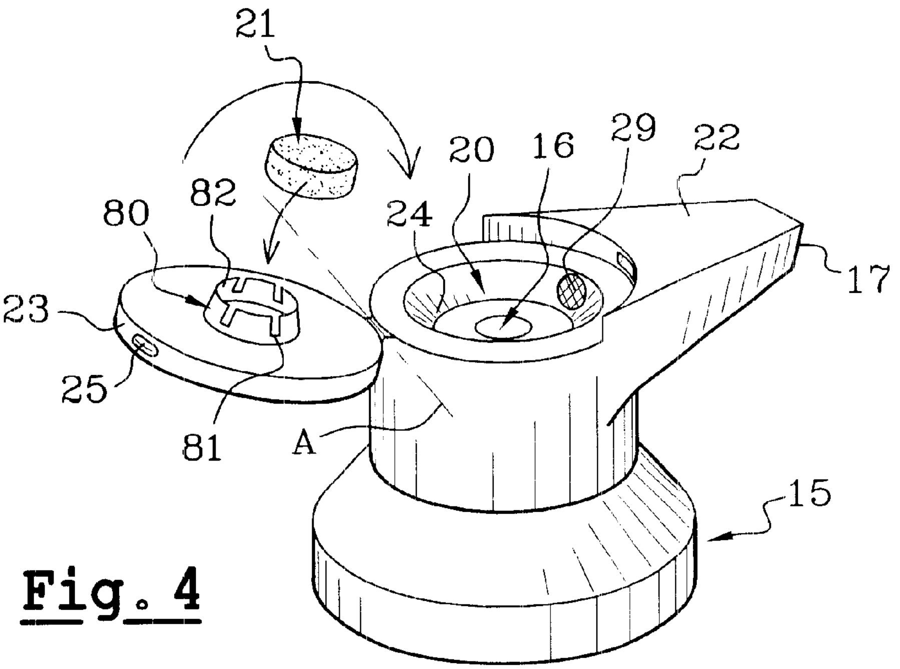
FIG. 4 is a perspective view of an optional embodiment of a dispensing head according to another optional aspect of the invention.

The dispensing head 15 shown in FIG. 4 may be distinguished from the dispensing head of FIG. 3 in that the second product in solid block form 21 is placed inside a perforated skirt 80 carried by the closure element 23. The skirt 80 may have a number of slots 81 delimiting elastically deformable tabs capable of trapping the block of product 21 prior to its first use. In accordance with the illustration in FIG. 5, by closing the lid 23, the free end 82 of the skirt 80 comes more or less into contact with the closed end of the cavity 20, so as to retain the second product in block form 21 inside the skirt 80. The product P contained in the reservoir may come into contact with the solid block of product 21 via the open end of the skirt 80. The mixture of the two products may be directed toward the outlet orifice 17 via the axial slots 81.

Figure 5:
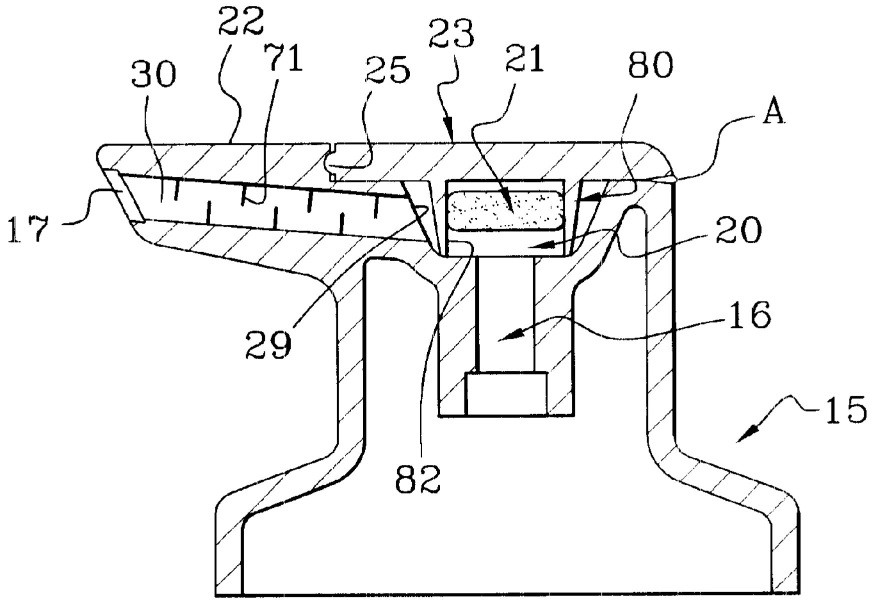
FIG. 5 is a cross-sectional view of the dispensing head of FIG. 4.

The optional embodiment of FIG. 5 may also include baffles 71 provided in the passage portion 30 leading to the outlet orifice 17. Baffles 71 may facilitate the homogenization of the mixture of the first and second products as they are flowed toward the outlet orifice 17. For reasons associated with the molding of such a part, and also with cleaning it, particularly the passage portion 30 comprising the baffles, it may be possible for the moveable element to extend as far as the outlet orifice 17, thus partially delimiting the passage portion 30. The other ways in which the dispensing head 15 according to this optional embodiment works are similar to the operation described with reference to the previous optional embodiments.

Figure 6A:
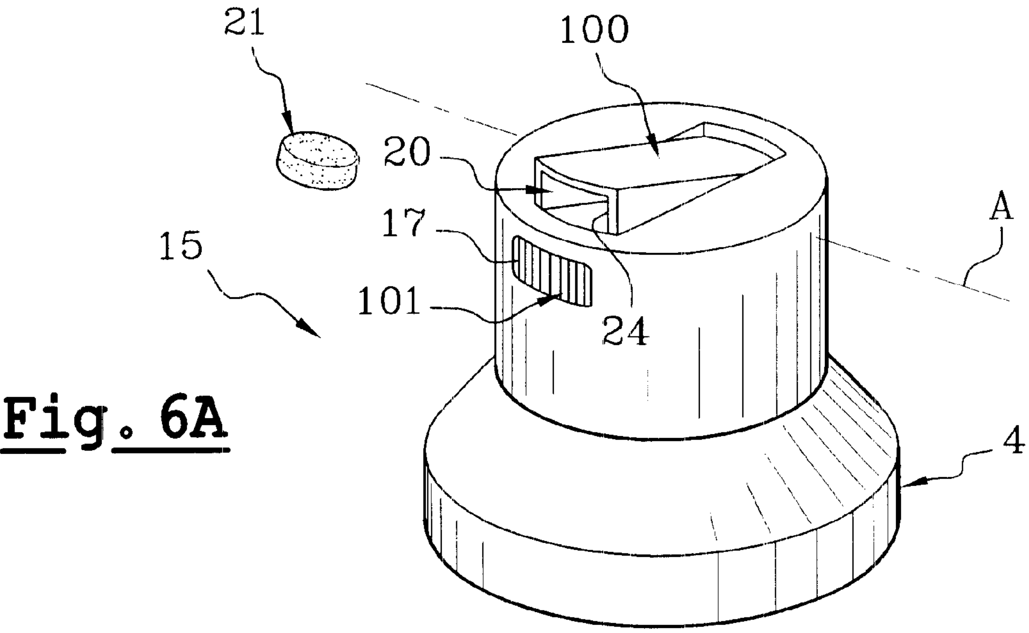
FIG. 6A is a perspective view of an optional embodiment of a dispensing head according to yet another optional aspect of the invention.
Figure 6B:
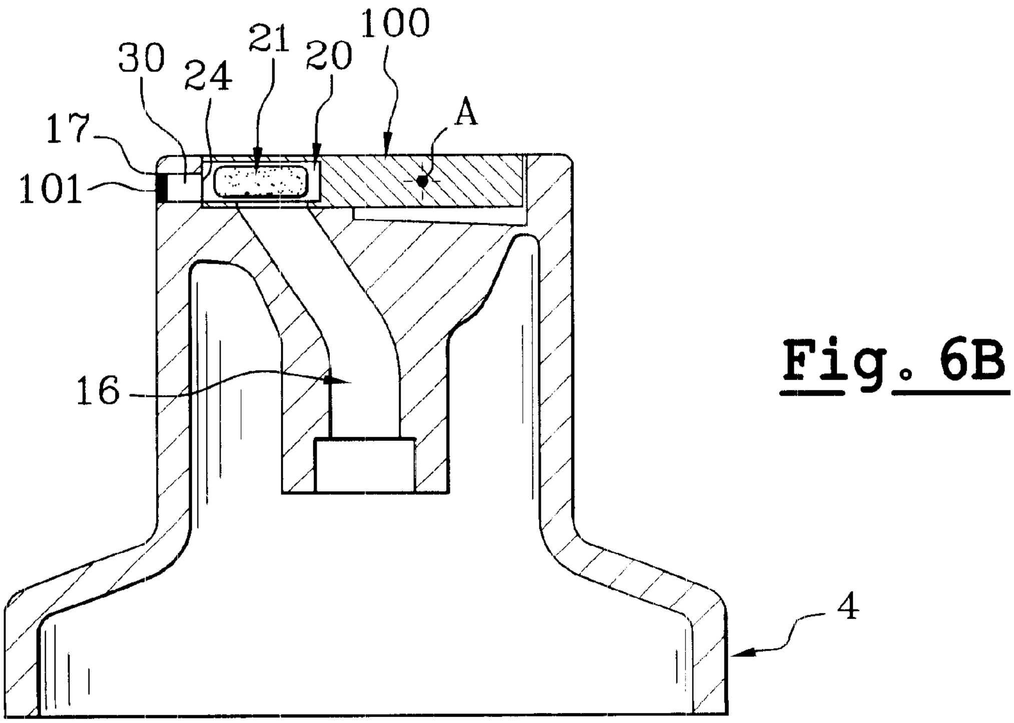
FIG. 6B is a cross-sectional view of the dispensing head of FIG. 6A.

In the optional embodiment of FIGS. 6A–6B, the dispensing head 15 comprises a body 4 configured to be mounted on a reservoir (not shown). The reservoir may be equipped with a pump, of which an emerging stem (not depicted) may be configured to be force-fitted into an axial end piece delimiting a passage portion 16. The passage portion 16 may open into a cavity 20 formed in a moveable element 100. The moveable element 100 may be articulably coupled such that the moveable element articulates with respect to the body 4 about an axis A. When the moveable part 100 is in the flipped down position (i.e., the closed position shown in FIG. 6B), the cavity 10 may have an opening 24 in communication with a passage portion 30 situated downstream of the cavity 20. The passage portion 30 may open into an outlet orifice 17. As an option, the outlet orifice 17 may be selectively closed by an elastomeric valve 101.

In use, the user may articulate moveable part 100 about the axis A so as to provide access to the opening 24. Through the opening 24, the user may then introduce into the cavity 20 a solid pellet 21 of a second product with which the first product P contained in the reservoir is intended to come into contact. The user may then pivot the moveable part 100 down so as to place the cavity 20 and the outlet orifice 17 in flow communication. The dispensing head may then be ready for use. A dispensing of the mixture may take place by actuating a pump on the reservoir (not shown) in response to the dispensing head 15 being pushed axially with respect to the reservoir.

The pellet 21 may be dissolvable by the first product P from the reservoir. Once the pellet 21 has been completely dissolved, it may easily be replaced by proceeding as indicated above. It may be possible, before a new pellet of the second product is introduced into the cavity 20, for the dispensing head to be rinsed in order to clean it.

Figure 7A:
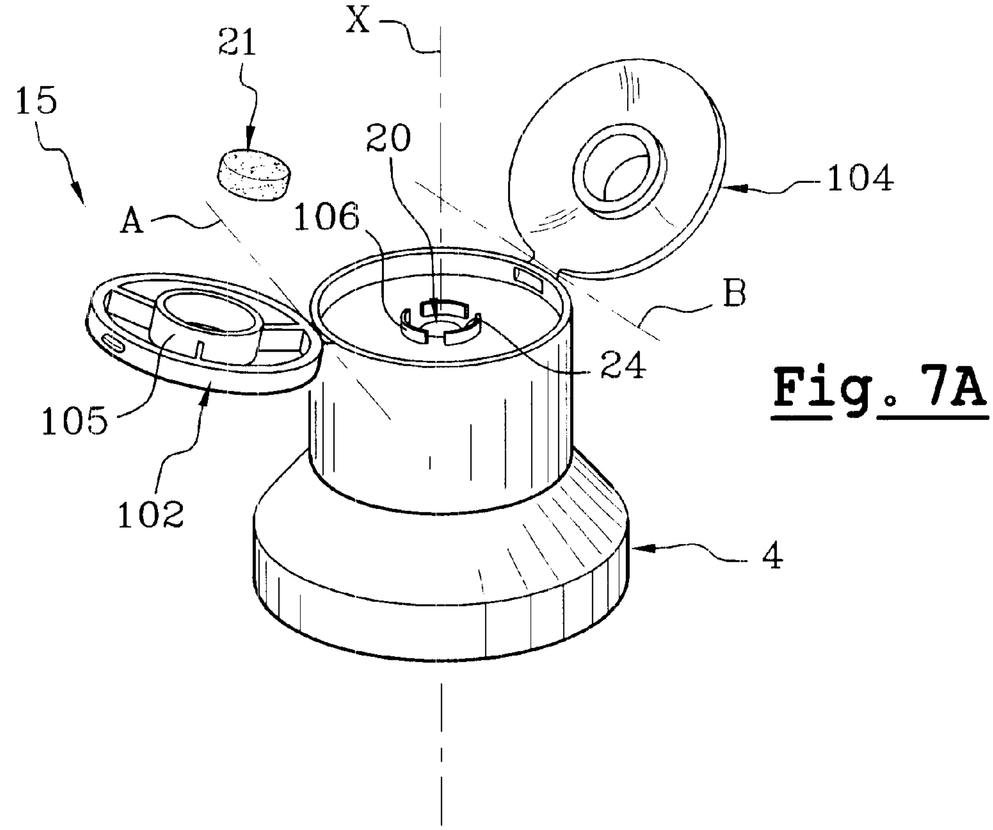
FIG. 7A is a perspective view of an optional embodiment of a dispensing head according to yet another optional aspect of the invention.
Figure 7B:
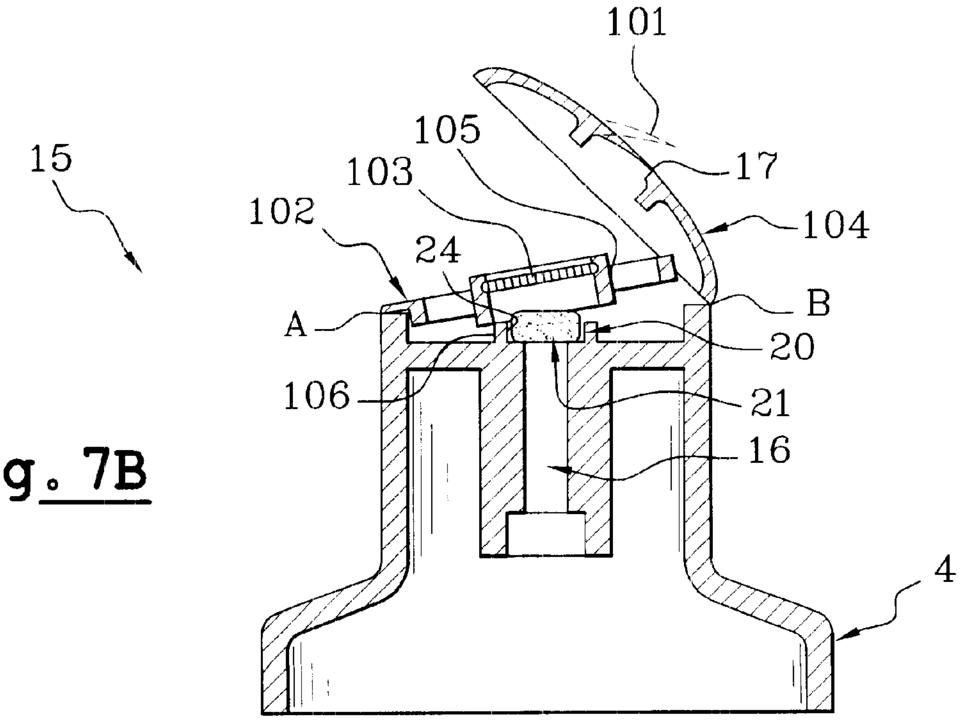
FIG. 7B is a cross-sectional view of the dispensing head of FIG. 7A.

In the optional embodiment of FIGS. 7A–7B, the dispensing head 15 may comprise a body 4 intended to be mounted on a reservoir (not shown). The reservoir may be equipped with a pump including an emerging stem (not shown) intended to be force-fitted into an axial end piece delimiting a passage portion 16. The passage portion 16 may open into a cavity 20. The bottom part of the cavity may be delimited by a discontinuous skirt 106 formed by the body 4. The discontinuous skirt 106 may be a continuation of the passage portion 16. The upper part of the cavity 20 may be formed by a portion of a moveable element 102. The moveable element 102 may be configured to articulate with respect to the body 4 about a fixed axis A. The axis A may be substantially perpendicular to an axis X of the dispensing head 15.

The bottom part of the cavity 20 may delimit an opening 24. The moveable element 102 may comprise an axial skirt 105. Near one end of the skirt 105 may be a grating 103. The grating 103 may be configured to extend across the opening 24 and hold the pellet 21 in place inside its cavity 20 when the moveable element 102 is in the flipped down position (i.e., the closed position).

The dispensing head 15 also comprises a second moveable element, which may be in the form of a lid 104, articulably coupled to the body 4 on the opposite side to the moveable element 102. The lid 104 may be configured to articulate with respect to the body 4 about an axis B that extends substantially parallel to the axis A. The lid 104 may comprise an axial orifice 17 equipped with a valve 101 that may open under the pressure of the product.

Upon use, the user may lift the lid 104 by pivoting it about the axis B. The moveable element 102 may then be lifted by pivoting it about the axis A. A pellet 21 may be introduced into the cavity 20 through the opening 24. The user may then flip the intermediate part 102 down about the axis A and pivot the lid 104 down about the axis B. The dispensing head 15 may then be ready for use.

Once the pellet of second product 21 has been completely dissolved by the first product P in the reservoir, it can easily be replaced by proceeding as indicated above. It may be possible, before a new pellet is introduced, for the dispensing head 15 to be rinsed in order to clean it.

In the optional embodiment of FIG. 8, the cavity 20 that accommodates the second product 21 may be formed just upstream of a valve 101 that opens under the pressure of the first product being dispensed from the reservoir. The second product 21, which may be in a solid or semi-solid pellet form, may be introduced into the cavity 20 via the product outlet orifice 17. Care should be taken, for example, by using an appropriate tool, to pivot the valve 101 about the axis A, so as to uncover the opening enough to allow the pellet 21 to pass therethrough This position for introducing the pellet 21 into the housing 20 is depicted in FIG. 8.

Once the pellet 21 has been introduced into the cavity 20, the valve 101 may return by an elastic return to its closed position, so as to hold the pellet 21 back inside the cavity 20. In use, the first product P conveyed through the passage 16 of the dispensing head 15 enters the cavity 20 where it is brought into contact with the second product 21, which dissolves at some rate. Under the pressure of the mixture of the first and second product, the valve 101 may move away from the edge delimiting the outlet opening 17 by pivoting about the axis A. However, the valve 101 may remain close enough to the edge delimiting the outlet opening 17 for it not to be possible for the pellet 21 to be carried along with the mixture through the outlet opening 17.

A dispensing head 15 according to the latter optional embodiments just described also can be used in combination with a reservoir in the form of a tube or tube bottle with elastically compressible walls and for which the product is made to exit by reversibly squeezing the walls of the reservoir.

In the optional embodiment of FIG. 9, a dispensing assembly 1 comprises a first reservoir 90 and a second reservoir 91, each one surmounted by a pump or by a valve. The dispensing head 15 which caps the reservoirs 90, 91 may be capable of operating the two pumps or valves simultaneously in response to pressure exerted on the pressing surface 23 of the dispensing head. The dispensing head is in other respects in accordance with any one of the embodiments described with reference to FIGS. 3–5, 6A–6B, 7A–7B or 8. With this optional embodiment, a mixture or a base composition, itself formed by the mixing of two first products packaged separately in each of the reservoirs 90 and 91, and of a second product in solid or semi-solid form packaged in the dispensing head 15 may be dispensed.

Preferably, the compositions according to optional aspects of the invention are cosmetic, dermatological, or pharmaceutical compositions used for treating the hair, the skin, or the nails. However, in its broadest aspects, the present invention could be used to store and dispense many other types of substances. For example, the dispenser may be used to dispense a variety of products, such as cleaning solutions, polishes, clothing dyes, or the like. Moreover, although reference was made to the second product as being in solid-or semi-solid form, it is contemplated that the second product may be a flowable substance, such as a liquid.

Furthermore, sizes of various structural parts and materials used to make these parts are illustrative and exemplary only and one of ordinary skill in the art would recognize that these sizes and materials can be changed as necessary to produce different effects or desired characteristics of the dispensing head or dispensing assembly.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A dispensing head comprising:

a passage configured to be placed in flow communication with at least one reservoir for containing a first product;

a cavity in flow communication with the passage, the cavity being configured to contain a second product;

an outlet orifice in flow communication with the cavity, the outlet orifice being configured to dispense the first product and the second product together; and a moveable element configured to articulate between an open position providing access to the cavity from outside the dispensing head so as to permit a user to introduce the second product directly into the cavity and a closed position closing off access to the cavity from outside the dispensing head.

2. The dispensing head of claim 1, wherein the cavity is located upstream of the outlet orifice in a dispensing flow direction.

3. The dispensing head of claim 1, wherein the cavity is located downstream of at least a portion of the passage in a dispensing flow direction.

4. The dispensing head of claim 1, wherein at least a portion of the passage is located upstream of the cavity in a dispensing flow direction.

5. The dispensing head of claim 1, wherein the moveable element is further configured to selectively open and close the outlet orifice from flow communication with the cavity.

6. The dispensing head of claim 1, wherein the moveable element is configured to articulate with respect to a portion of the passage disposed downstream of the cavity.

7. The dispensing head of claim 1, wherein the moveable element is configured to sealingly cover the cavity when the moveable element is in the closed position.

8. The dispensing head of claim 1, further comprising a mixing mechanism for facilitating mixing of the first and second products together.

9. The dispensing head of claim 8, wherein the mixing mechanism comprises at least one of baffles, reducers, and breakers.

10. The dispensing head of claim 8, wherein the mixing mechanism is disposed between the cavity and the outlet.

11. The dispensing head of claim 1, further comprising a perforated member disposed between the cavity and the outlet orifice.

12. The dispensing head of claim 1, wherein the moveable element comprises one of a lid attached to a portion of the dispensing head via an articulation and a valve configured to open in response to sufficient pressure.

13. The dispensing head of claim 1, wherein the moveable element defines at least a portion of the cavity.

14. The dispensing head of claim 1, further comprising a second moveable element, at least a portion of the second moveable element defining the outlet orifice.

15. The dispensing head of claim 14, wherein the second moveable element is configured to articulate with respect to at least a portion of the dispensing head.

16. A dispensing head comprising:

a passage configured to be placed in flow communication with the at least one reservoir for containing a first product;

a cavity in flow communication with the passage, the cavity being configured to contain a second product;

an outlet orifice in flow communication with the cavity, the outlet orifice being configured to dispense the first product and the second product together; and a moveable element configured to articulate between an open position providing access to the cavity from outside the dispensing head and a closed position closing off access to the cavity from outside the dispensing head, wherein the moveable element is configured to hold the second product and to position the second product in the cavity when the moveable element is in the closed position.

17. The dispensing head of claim 1, wherein the dispensing head is configured to actuate one of a pump and a valve to dispense the first product from the reservoir.

18. The dispensing head of claim 17, wherein the dispensing head is in the form of a push-button actuator.

19. The dispensing head of claim 1, further comprising the second product, wherein the cavity contains the second product.

20. The dispensing head of claim 19, wherein the second product is chosen from a solid product and a semi-solid product.

21. The dispensing head of claim 20, wherein the second product comprises a product chosen from a solid compress, a gum, a loose powder, a compacted powder, a gel, a membrane configured to burst under pressure of the first product, and a membrane configured to dissolve upon contact with the first product.

22. The dispensing head of claim 19, further comprising a porous support containing the second product, wherein the porous support is chosen from a open-cell foam, a semi-open-cell foam, a woven material, a non-woven material, and a sintered material.

23. The dispensing head of claim 19, wherein the second product comprises a cosmetically active ingredient.

24. A dispensing assembly comprising:

the at least one reservoir, wherein the at least one reservoir is configured to contain the first product; and the dispensing head of claim 1 associated with the reservoir.

25. The dispensing assembly of claim 24, further comprising a dispensing mechanism associated with the reservoir, the dispensing head being configured to actuate the dispensing mechanism to dispense the first product from the reservoir.

26. The dispensing assembly of claim 25, wherein the dispensing mechanism is chosen from a pump and a valve.

27. The dispensing assembly of claim 26, wherein the passage is configured to engage with a stem on one of the pump and the valve.

28. The dispensing assembly of claim 24, wherein the at least one reservoir is defined by at least one moveable portion.

29. The dispensing assembly of claim 28, wherein the moveable portion is chosen from a flexible wall and a piston.

30. The dispensing assembly of claim 24, wherein the at least one reservoir has a variable volume.

31. The dispensing assembly of claim 30, wherein the volume of the at least one reservoir decreases as the first product is dispensed from the at least one reservoir.

32. The dispensing assembly of claim 24, wherein the at least one reservoir comprises two reservoirs.

33. The dispensing assembly of claim 32, further comprising two dispensing mechanisms, each dispensing mechanism being associated with one of the reservoirs to dispense the product.

34. The dispensing assembly of claim 33, wherein the dispensing head is configured to actuate both dispensing mechanisms simultaneously.

35. The dispensing assembly of claim 24, further comprising the second product, wherein the cavity contains the second product.

36. The dispensing assembly of claim 35, wherein the second product is chosen from a solid product and a semi-solid product.

37. The dispensing assembly of claim 35, wherein the second product comprises a cosmetically active ingredient.

38. The dispensing assembly of claim 24, further comprising the first product, wherein the reservoir contains the first product.

39. The dispensing assembly of claim 38, further comprising the second product, wherein the cavity contains the second product, and wherein the first product is capable of dissolving the second product.

40. A method for dispensing a first product and a second product, the method comprising:

providing the dispensing head of claim 1, wherein the at least one reservoir contains the first product;

providing the second product in the cavity;

flowing the first product from the reservoir to the cavity; and passing the first product and the second product from the cavity and through the outlet orifice.

41. The method of claim 40, further comprising actuating one of a pump and a valve to flow the first product from the at least one reservoir.

42. The method of claim 40, wherein the actuating comprises moving at least a portion of the dispensing head relative to the at least one reservoir.

43. The method of claim 40, wherein there are a plurality of second products and the method further comprises removing one of the second products that is disposed in the cavity and replacing the removed second product with another one of the second products.

44. The method of claim 43, wherein the plurality of second products are chosen from second products having similar characteristics and second products having differing characteristics.

45. The method of claim 40, further comprising articulating the moveable element to the open position to provide the second product in the cavity.

46. The method of claim 40, further comprising mixing the first and second products in the cavity, wherein the passing comprises passing the mixture through the outlet orifice.

47. The method of claim 40, further comprising dissolving the second product with the first product.

48. A dispensing head comprising:

a body defining a passage, a cavity, and a dispensing outlet; and a moveable element configured to articulate with respect to the body from an open position providing access to the cavity from outside the dispensing head so as to permit a user to introduce a second product directly into the cavity to a closed position closing off access to the cavity from outside the dispensing head, wherein the passage is configured to be in flow communication with at least one reservoir for containing a first product, and wherein the cavity is configured to contain the second product to be dispensed together with the first product through the outlet.

49. The dispensing head of claim 48, wherein the moveable element is configured to articulate with respect to at least a portion of the dispensing head.

50. The dispensing head of claim 49, wherein the moveable element is connected to the dispensing head via an articulation member.

51. The dispensing head of claim 50, wherein the articulation member comprises a film hinge.

52. The dispensing head of claim 48, wherein the cavity is located upstream of the outlet in a dispensing flow direction.

53. The dispensing head of claim 48, wherein the cavity is located downstream of at least a portion of the passage in a dispensing flow direction.

54. The dispensing head of claim 48, wherein at least a portion of the passage is located upstream of the cavity in a dispensing flow direction.

55. The dispensing head of claim 48, wherein the moveable element is configured to articulate with respect to the outlet and is further configured to selectively open and close the outlet from flow communication with the cavity.

56. The dispensing head of claim 48, wherein the moveable element is configured to articulate with respect to a portion of the passage disposed downstream of the cavity in a dispensing flow direction.

57. The dispensing head of claim 48, wherein the moveable element is configured to sealingly cover the cavity when the moveable element is in the closed position.

58. The dispensing head of claim 48, further comprising a mixing mechanism for facilitating mixing of the first product and the second product together.

59. The dispensing head of claim 58, wherein the mixing mechanism is disposed between the cavity and the outlet.

60. The dispensing head of claim 58, wherein the mixing mechanism comprises at least one of baffles, reducers, and breakers.

61. The dispensing head of claim 48, further comprising a perforated member disposed between the cavity and the outlet.

62. The dispensing head of claim 48, wherein the moveable element comprises one of a lid attached to a portion of the dispensing head via an articulation member and a valve configured to open in response to sufficient pressure.

63. The dispensing head of claim 48, wherein the moveable element defines at least a portion of the cavity.

64. The dispensing head of claim 48, further comprising a second moveable element, at least a portion of the second moveable element defining the outlet.

65. The dispensing head of claim 64, wherein the second moveable element is configured to articulate with respect to at least a portion of the dispensing head.

66. A dispensing head comprising:

a body defining a passage, a cavity, and a dispensing outlet; and a moveable element configured to move with respect to the body from an open position providing access to the cavity from outside the dispensing head to a closed position closing off access to the cavity from outside the dispensing head, wherein the passage is configured to be in flow communication with at least one reservoir for containing a first product, and wherein the cavity is configured to contain the second product to be dispensed together with the first product through the outlet, and wherein the moveable element is configured to hold the second product and to position the second product in the cavity when the moveable element is in the closed position.

67. The dispensing head of claim 48, wherein the dispensing head is configured to actuate one of a pump and a valve to dispense the first product from the reservoir.

68. The dispensing head of claim 67, wherein the dispensing head is in the form of a push-button actuator.

69. The dispensing head of claim 48, further comprising the second product, wherein the cavity contains the second product.

70. The dispensing head of claim 69, wherein the second product is chosen from a solid product and a semi-solid product.

71. The dispensing head of claim 70, wherein the second product comprises a product chosen from a solid compress, a gum, a loose powder, a compacted powder, a gel, a membrane configured to burst under pressure of the first product, and a membrane configured to dissolve upon contact with the first product.

72. The dispensing head of claim 69, further comprising a porous support containing the second product, wherein the porous support is chosen from a open-cell foam, a semi-open-cell foam, a woven material, a non-woven material, and a sintered material.

73. The dispensing head of claim 69, wherein the second product comprises a cosmetically active ingredient.

74. The dispensing head of claim 48, wherein the dispensing outlet comprises an orifice.

75. A dispensing assembly comprising:

the at least one reservoir, wherein the at least one reservoir is configured to contain the first product; and the dispensing head of claim 48 associated with the reservoir.

76. The dispensing assembly of claim 75, further comprising a dispensing mechanism associated with the at least one reservoir, the dispensing head being configured to actuate the dispensing mechanism to dispense the first product from the reservoir.

77. The dispensing assembly of claim 76, wherein the dispensing mechanism is chosen from a pump and a valve.

78. The dispensing assembly of claim 77, wherein the passage is configured to engage with a stem on one of the pump and the valve.

79. The dispensing assembly of claim 75, wherein the at least one reservoir is defined by at least one moveable portion.

80. The dispensing assembly of claim 79, wherein the moveable portion is chosen from a flexible wall and a piston.

81. The dispensing assembly of claim 75, wherein the at least one reservoir has a variable volume.

82. The dispensing assembly of claim 81, wherein the volume of the at least one reservoir decreases as the first product is dispensed from the at least one reservoir.

83. The dispensing assembly of claim 75, wherein the at least one reservoir comprises two reservoirs.

84. The dispensing assembly of claim 83, further comprising two dispensing mechanisms, each dispensing mechanism being associated with one of the reservoirs to dispense product.

85. The dispensing assembly of claim 84, wherein the dispensing head is configured to actuate both dispensing mechanisms simultaneously.

86. The dispensing assembly of claim 75, further comprising the second product, wherein the cavity contains the second product.

87. The dispensing assembly of claim 86, wherein the second product is chosen from a solid product and a semi-solid product.

88. The dispensing assembly of claim 86, wherein the second product comprises a cosmetically active ingredient.

89. The dispensing assembly of claim 75, further comprising the first product, wherein the at least one reservoir contains the first product.

90. The dispensing assembly of claim 89, further comprising the second product, wherein the cavity contains the second product, and wherein the first product is capable of dissolving the second product.

91. A method for dispensing a first product and a second product, the method comprising:

providing the dispensing head of claim 48, wherein the at least one reservoir contains the first product;

providing the second product in the cavity;

flowing the first product from the at least one reservoir to the cavity; and passing the first product and the second product from the cavity and through the dispensing outlet.

92. The method of claim 91, further comprising actuating one of a pump and a valve to flow the first product from the at least one reservoir.

93. The method of claim 92, wherein the actuating comprises moving the dispensing head relative to the at least one reservoir.

94. The method of claim 91, wherein there are a plurality of second products and the method further comprises removing one of the second products that is disposed in the cavity and replacing the removed second product with another one of the second products.

95. The method of claim 94, wherein the plurality of second products are chosen from second products having similar characteristics and second products having differing characteristics.

96. The method of claim 91, further comprising moving the moveable element to the open position to provide the second product in the cavity.

97. The method of claim 96, wherein the moving the moveable element comprises articulating the moveable element with respect to the body.

98. The method of claim 91, further comprising mixing the first and second products in the cavity, wherein the passing comprises passing the mixture through the outlet orifice.

99. The method of claim 91, further comprising dissolving the second product with the first product.

100. A dispensing assembly comprising:

at least one reservoir for containing a first product;

an airless pump associated with the at least one reservoir for flowing the first product from the at least one reservoir; and a dispensing head for actuating the airless pump, the dispensing head comprising a cavity configured to contain a second product, and an outlet in flow communication with the cavity, the outlet being configured to dispense the first product and the second product upon actuation of the airless pump.

101. The dispensing assembly of claim 100, wherein the dispensing head further comprises a passage, at least a portion of the passage being configured to engage with the airless pump.

102. The dispensing assembly of claim 101, wherein at least a portion of the passage is located upstream of the cavity in a dispensing flow direction.

103. The dispensing assembly of claim 101, wherein the passage is in flow communication with the cavity.

104. The dispensing assembly of claim 100, further comprising a moveable element coupled to at least a portion of the dispensing head, the moveable element being configured to move from an open position to provide access to the cavity from outside the dispensing assembly to a closed position closing off access to the cavity from outside the dispensing assembly.

105. The dispensing assembly of claim 104, wherein the moveable element is configured to articulate with respect to at least a portion of the dispensing head.

106. The dispensing assembly of claim 104, wherein the moveable element is coupled to at least the portion of the dispensing head via an articulation member.

107. The dispensing assembly of claim 106, wherein the articulation member comprises a film hinge.

108. The dispensing assembly of claim 104, wherein the moveable element defines at least a portion of the cavity.

109. The dispensing assembly of claim 104, wherein the moveable element is configured to hold the second product and to position the second product in the cavity when the moveable element is in the closed position.

110. The dispensing assembly of claim 104, wherein the moveable element is configured to move with respect to the outlet to selectively place the outlet in flow communication with the cavity.

111. The dispensing assembly of claim 100, wherein the cavity is located upstream of the outlet in a dispensing flow direction.

112. The dispensing assembly of claim 104, wherein the moveable element is configured to articulate with respect to a portion of the passage disposed downstream of the cavity in a dispensing flow direction.

113. The dispensing assembly of claim 104, wherein the moveable element is configured to sealingly cover the cavity when the moveable element is in the closed position.

114. The dispensing assembly of claim 100, wherein the dispensing head further comprises a mixing mechanism for facilitating mixing of the first and second products together.

115. The dispensing assembly of claim 114, wherein the mixing mechanism comprises at least one of baffles, reducers, and breakers.

116. The dispensing assembly of claim 114, wherein the mixing mechanism is disposed between the cavity and the outlet.

117. The dispensing assembly of claim 100, further comprising a perforated member disposed between the cavity and the outlet.

118. The dispensing assembly of claim 104, wherein the moveable element comprises one of a lid attached to the dispensing head via an articulation member and a valve configured to open in response to sufficient pressure.

119. The dispensing assembly of claim 104, wherein the moveable element defines at least a portion of the cavity.

120. The dispensing assembly of claim 104, further comprising a second moveable element, at least a portion of the second moveable element defining the outlet.

121. The dispensing assembly of claim 120, wherein the second moveable element is configured to articulate with respect to at least a portion of the dispensing head.

122. The dispensing assembly of claim 100, wherein the dispensing head is in the form of a push-button actuator.

123. The dispensing assembly of claim 100, further comprising the second product, wherein the cavity contains the second product.

124. The dispensing assembly of claim 123, wherein the second product is chosen from a solid product and a semi-solid product.

125. The dispensing assembly of claim 124, wherein the second product comprises a product chosen from a solid compress, a gum, a loose powder, a compacted powder, a gel, a membrane configured to burst under pressure of the first product, a membrane configured to dissolve upon contact with the first product.

126. The dispensing assembly of claim 123, further comprising a porous support containing the second product, wherein the porous support is chosen from a open-cell foam, a semi-open-cell foam, a woven material, a non-woven material, and a sintered material.

127. The dispensing assembly of claim 123, wherein the second product comprises a cosmetically active ingredient.

128. The dispensing assembly of claim 100, wherein the outlet comprises an orifice.

129. A method for dispensing a first product and a second product, the method comprising:

providing the dispensing assembly of claim 100, wherein the at least one reservoir contains the first product;

providing the second product in the cavity;

flowing the first product from the at least one reservoir to the cavity; and passing the first product and the second product from the cavity and through the outlet.

130. The method of claim 129, further comprising actuating the airless pump by moving the dispensing head relative to the at least one reservoir.

131. The method of claim 129, wherein there are a plurality of second products and the method further comprises removing one of the second products that is disposed in the cavity and replacing the removed second product with another one of the second products.

132. The method of claim 131, wherein the plurality of second products are chosen from second products having similar characteristics and second products having differing characteristics.

133. The method of claim 130, wherein the dispensing head further comprises a moveable element, and wherein the method further comprises articulating the moveable element to an open position to provide the second product in the cavity.

* * * * *

UNITED STATES PATENT AND TRADEMARK OFFICE

CERTIFICATE OF CORRECTION

PATENT NO. : 6,622,890 B2
DATED : September 23, 2003
INVENTOR(S) : Jean-Louis H. Gueret It is certified that error appears in the above-identified patent and that said Letters Patent is hereby corrected as shown below:

Column 12,
Line 19, replace “a open-cell” with -- an open cell --;

Column 15,
Line 3, replace “a open-cell” with -- an open cell --; and

Column 18,
Line 12, replace “a open-cell” with -- an open cell --.

Signed and Sealed this

Ninth Day of December, 2003

JAMES E. ROGAN
*Director of the United States Patent and Trademark Office*